United States Patent
Jahkonen et al.

(10) Patent No.: US 7,184,286 B2
(45) Date of Patent: Feb. 27, 2007

(54) BRIDGE FOR DRIVING A DIRECT-CURRENT OR ALTERNATING CURRENT LOAD

(75) Inventors: Pekka Jahkonen, Hyvinkaa (FI); Esa Putkinen, Hyvinkaa (FI)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 11/039,780

(22) Filed: Jan. 24, 2005

(65) Prior Publication Data

US 2005/0127860 A1    Jun. 16, 2005

Related U.S. Application Data

(60) Division of application No. 10/387,497, filed on Mar. 14, 2003, now Pat. No. 6,898,094, which is a continuation-in-part of application No. 10/352,205, filed on Jan. 28, 2003, now Pat. No. 6,697,273.

(30) Foreign Application Priority Data

| Nov. 19, 2001 | (FI) | ................................. 20012244 |
| Sep. 24, 2002 | (FI) | ..................... PCT/FI02/00767 |
| Feb. 7, 2003 | (FI) | ................................. 20030190 |

(51) Int. Cl.
H02M 3/34    (2006.01)
H02M 7/5387    (2006.01)
H02P 5/34    (2006.01)

(52) U.S. Cl. ........................ 363/98; 363/132

(58) Field of Classification Search ................. 363/16, 363/17, 97, 98, 131, 132; 318/800–803, 318/805, 806, 812, 814
See application file for complete search history.

(56) References Cited

U.S. PATENT DOCUMENTS

| 5,107,190 A | 4/1992 | Schultz et al. |
| 5,428,522 A | 6/1995 | Millner et al. |
| 5,703,768 A | 12/1997 | Kanna et al. |
| 5,757,636 A | 5/1998 | Fletcher |
| 5,912,813 A | 6/1999 | Kerkman et al. |

(Continued)

FOREIGN PATENT DOCUMENTS

DE    3428239 A1    3/1985

(Continued)

OTHER PUBLICATIONS

Abdelhamid, T.H., "Single-phase DC drive system controlled by sinusoidal PWM full-bridge DC-DC converter with improved input current waveform," IEEE International Electric Machines and Drives Conference, IEMDC '99, Seattle, WA, USA, May 9-12, 1999, pp. 670-672.

*Primary Examiner*—Matthew V. Nguyen
(74) *Attorney, Agent, or Firm*—Birch, Stewart, Kolasch & Birch, LLP

(57) ABSTRACT

A DC/DC bridge having a power stage provided with controllable semiconductor switches controls a direct currently load, and comprises two bridge sections, one of which bridge sections conducts direct currently while the other bridge section is controlled via pulse width modulation to regulate the current magnitude. Two of three bridge arms of the DC/DC bridge are connected in parallel and semiconductor switches in the parallel-connected bridge arms are controlled via pulse width modulation to form a pulse width modulation controlled bridge section.

3 Claims, 3 Drawing Sheets

U.S. PATENT DOCUMENTS

| | | |
|---|---|---|
| 6,131,692 A | 10/2000 | Kawasuji |
| 6,172,882 B1 | 1/2001 | Tanaka et al. |
| 6,211,657 B1 | 4/2001 | Goluszek |
| 6,288,507 B1 | 9/2001 | Makino et al. |
| 6,438,004 B1 * | 8/2002 | Tanaka et al. ........... 363/56.02 |
| 6,486,632 B2 | 11/2002 | Okushima et al. |
| 6,630,751 B2 | 10/2003 | Curtis et al. |
| 6,678,177 B2 | 1/2004 | Asano et al. |
| 6,697,273 B1 | 2/2004 | Jahkonen et al. |
| 6,711,037 B2 * | 3/2004 | Odachi et al. ................. 363/98 |
| 6,836,416 B2 * | 12/2004 | Ishihara et al. ............. 363/132 |
| 6,898,094 B2 * | 5/2005 | Jahkonen et al. ............. 363/98 |

FOREIGN PATENT DOCUMENTS

| | | |
|---|---|---|
| EP | 0 352 728 A2 | 1/1990 |
| JP | 59-216489 A | 12/1984 |
| JP | 10-164888 A | 6/1998 |

* cited by examiner

US 7,184,286 B2

BRIDGE FOR DRIVING A DIRECT-CURRENT OR ALTERNATING CURRENT LOAD

This application is a Divisional of application Ser. No. 10/387,497 filed on Mar. 14, 2003 now U.S. Pat. No. 6,898,094, which was a Continuation-in-Part of application Ser. No. 10/352,205, filed Jan. 28, 2003, and issued as U.S. Pat. No. 6,697,273B1 on Feb. 24, 2004 and for which priority is claimed under 35 U.S.C. § 120. application Ser. No. 10/352,205 is the national phase of PCT International Application No. PCT/FI02/00767 filed on Sep. 24, 2002 under 35 U.S.C. § 371. The entire contents of each of the above-identified applications are hereby incorporated by reference. This application also claims priority of Application No. FI20012244 filed in Finland on Nov. 19, 2001, and Application No. FI20030190 filed in Finland on Feb. 7, 2003 under 35 U.S.C. § 119.

BACKGROUND OF THE INVENTION

1. Field of the Invention

The present invention relates to a DC/DC bridge for controlling a direct-current load, said bridge having a power stage provided with controllable semiconductor switches and comprising two bridge sections, one of which bridge sections conducts direct current while the other one is controlled via PWM to regulate the current magnitude.

2. Discussion of the Background Art

Elevator motor drives may be either alternating-current or direct-current motor drives. The drives may be controlled e.g. via PWM (Pulse Width Modulation). Today, alternating-current motor drives are fairly common, especially because of the simple construction of alternating-current motors. However, direct-current motor drives are still in use. It is not always appropriate to replace a direct-current motor drive with an alternating-current motor drive, because e.g. gearless direct-current motor drives and the direct-current motors used in them are durable, and it is therefore unnecessary to replace them with alternating-current motor drives. Besides, replacing the motor entails relatively high costs.

Since the trend is towards alternating-current motor drives, it is also hardly rational to specifically develop power electronics systems for use in the control of direct-current drives. In addition, semiconductor components, such as IGBTs, used in alternating-current drives are becoming increasingly efficient and economical. Moreover, it is to be expected that new regulations concerning network harmonics may result in future use of traditional thyristor bridges used in direct-current drives becoming more difficult.

SUMMARY OF THE INVENTION

The present application is directed to an electric motor drive capable of driving both direct current and alternating current loads, the electric motor drive comprising: a first bridge section, the first bridge section including first and second bridge arms selectively connectable in parallel or two separate output lines and connected to a direct current source, the first and second bridge arms each containing controllable semiconductor switch units; and a second bridge section, the second bridge section being connected to the direct current source and including a third bridge arm containing controllable semiconductor switch units, wherein the controllable semiconductor switch units of at least the first bridge section are controllable via pulse-width modulation to regulate current magnitude.

BRIEF DESCRIPTION OF THE DRAWINGS

In the following, the invention will be described in detail with reference to an example and the attached drawings, wherein.

DETAILED DESCRIPTION OF THE PREFERRED EMBODIMENT

Figure 1:
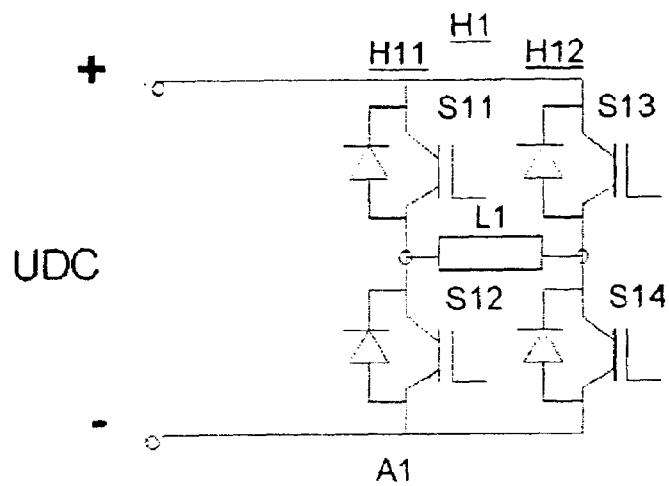
FIG. 1 presents a prior-art direct-current bridge.

FIG. 1 presents a prior-art PWM-controlled H-bridge H1 of a direct-current motor drive intended e.g. for an elevator application. It consists of two bridge arms H11 and H12 connected to a direct-current source UDC, each arm containing controllable semiconductor switches S11–S14 for the positive and negative poles, consisting of e.g. an inverse-parallel connection of an IGBT transistor and a diode. The bridge feeds a direct-current load L1, such as the direct-current motor of an elevator.

Figure 2:
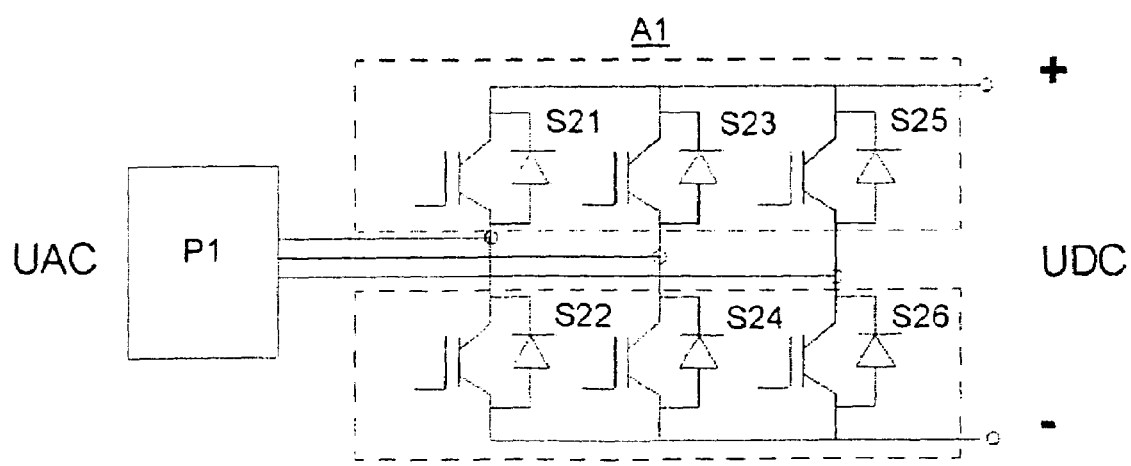
FIG. 2 presents a network bridge in an alternating-current drive.

FIG. 2 correspondingly presents a network bridge A1 as used in a prior-art three-phase alternating-current drive to rectify the alternating voltage of the network UAC into a direct voltage UDC, and an alternating-current inductor unit P1 connected before it. The bridge has in the upper and lower arms controllable semiconductor switches S21–S26, which are connected to each network phase and which may also consist of e.g. an inverse-parallel connection of an IGBT transistor and a diode.

In principle, the electric motor drive of the invention is like a prior-art three-phase alternating-current drive comprising a network converter (rectifier bridge), a motor bridge and inductors. The present invention relates expressly to the DC/DC bridge feeding the motor. The network bridge and the inductors may be e.g. as presented in FIG. 2. According to the invention, the same type of controllable semiconductor switches can be used in both the rectifier bridge and the motor bridge.

Figure 3:
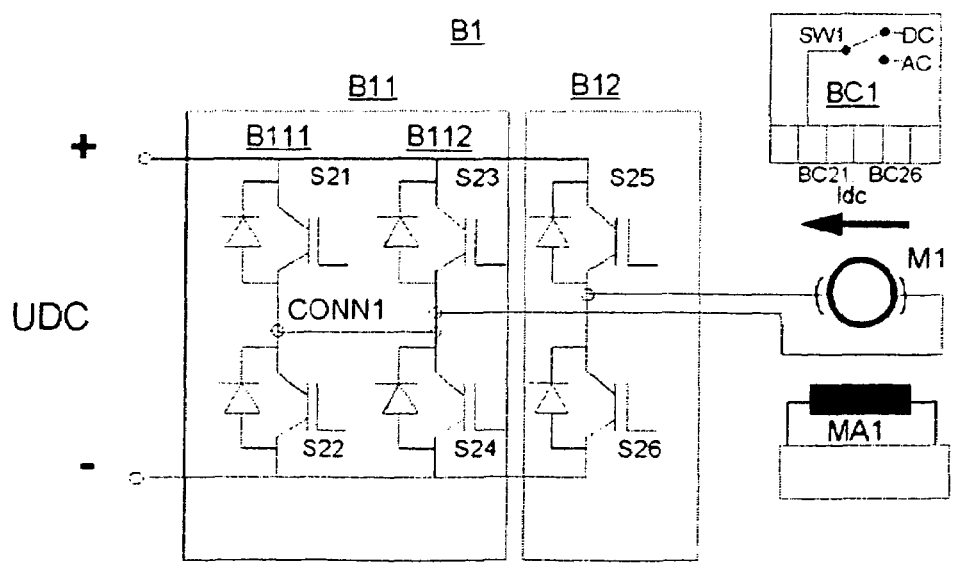
FIG. 3 presents a direct-current drive according to the invention, comprising a DC/DC bridge according to the invention.

FIG. 3 presents a DC/DC bridge B1 according to the invention, which is used to feed a direct-current motor M1, a direct current Idc flowing in the motor. The bridge is controlled by a control unit BC1. Magnetization of the motor is accomplished using a separate magnetizing unit MA1, which is controlled in a known manner.

The DC/DC bridge presented in FIG. 3 comprises two bridge sections B11, B12. The first bridge section in the bridge according to FIG. 3 comprises two arms B111 and B112, each containing controllable semiconductor switch units S21–S24. The bridge arms are connected to each other on the power stage circuit board via a connector CONN1. The second bridge section B12 consists of a single arm with controllable semiconductor switch units S25-S26. Thus, the bridge as a whole has three arms, corresponding to a three-phase DC/AC bridge. For each semiconductor switch, a controller BC21–BC26 is provided in the control unit BC1.

The modulation of the DC/DC bridge of the invention is done as follows: The PWM-controlled direct-current drive of the invention can use the same kind of semiconductor switches S21–S26 for PWM control as are used in an alternating-current drive. The direct-current drive can be selected e.g. by a switch SW1 in the control unit. Instead of alternating current, a zero-frequency is used (non-rotating field). In the direct-current drive of the invention, not all of the semiconductor switches have to switch a high-frequency PWM control signal, typically of a frequency of a few kHz; two of the switches, S25 and S26, can be used to select the torque direction (up/down), and the switches in question conduct pure DC current. The switches S21–S26 used for PWM control are turned on/off at a frequency of a few kHz to control the magnitude of the current Idc (the torque).

Figure 4:
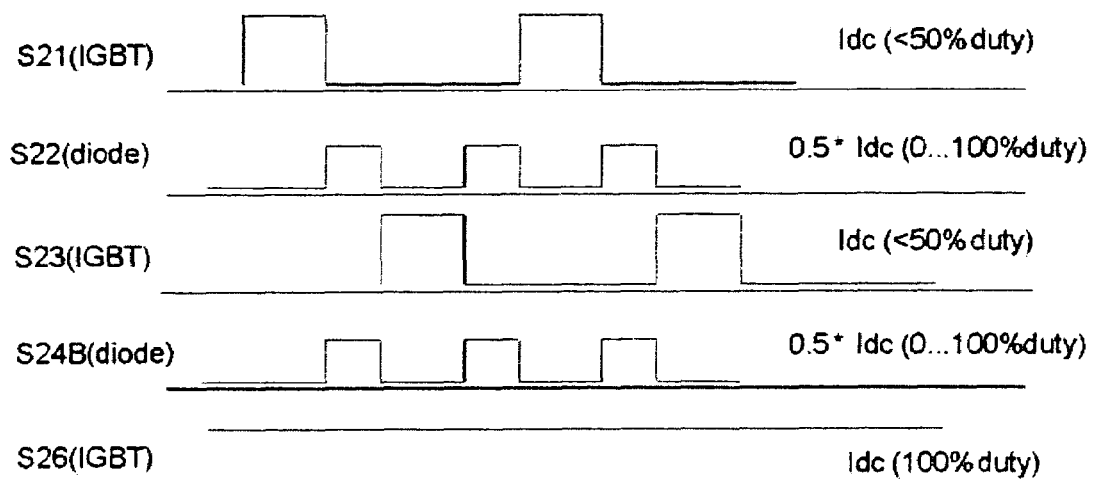
FIG. 4 presents a timing diagram for a DC/DC bridge according to the invention.

The greatest power dissipation occurs in the switches S21–S26 used for PWM control. In the control method of the invention, the switches used for PWM control are turned into conduction alternately in different arms, so the switches in question are only operated for about 50% of normal conduction time or less. This action is visualized in the timing diagram in FIG. 4, which represents the conduction times of switches S21, S23 and S26 as well as the conduction times of diodes S22 and S24.

From a thermal point of view, the invention provides the advantage that the power stage of an alternating-current drive can be fully utilized in a direct-current drive. Thermal dissipation in the IGBTs used in the circuit is typically double the dissipation in the switches that are not used in PWM control. Therefore, according to the invention, switches S21 and S23 are only kept conducting for at most 50% of the time in a cyclic manner. The conduction period varies according to the voltage (current) required.

As compared with the prior-art H-bridge, the circuit additionally provides the advantage that the ripple of the direct current Idc, which produces a disturbing noise, is reduced to about half of the original level. This advantage can be utilized by reducing the switching frequency of the PWM switches S21–S24, which will diminish thermal dissipation in the switches and increase the load capacity of the bridge.

Figure 5:
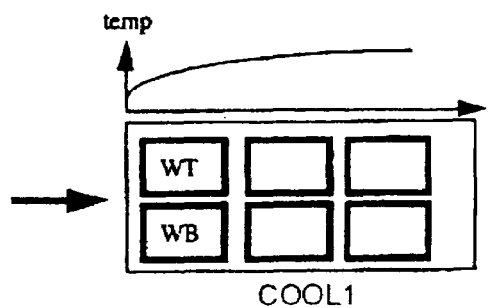
FIG. 5 illustrates the layout and cooling of the semiconductor switches in the DC/DC bridge of the invention.

In practice, direct-current switches may have higher dissipation because direct-current losses are slightly greater than switching-PWM losses. Therefore, switches S25 and S26 are placed on the air intake side (arrow) of the cooling segment COOL1 (FIG. 5) as it is cooler than the middle part of the segment or the air exit side, as indicated by the temperature curve TEMP.

It is obvious to the person skilled in the art that different embodiments of the invention are not limited to the example described above, but that they may be varied within the scope of the claims presented below. Besides IGBT, the switches used may also consist of other fully gate-controlled components. Besides a direct-current motor, the load may also consist of e.g. a braking magnet of an elevator.

The arrangement of the invention can be used in a wide range of electric drives. By applying the principle of the invention, it will be possible to cover the power range of direct-current elevator drives by using the latest IGBT technology. Alternating-current and direct-current drive modules can be assembled on the same production line, and the application can be selected mainly via software control.

The invention claimed is:

1. An electric motor drive capable of driving both direct current and alternating current loads, said electric motor drive comprising:
    a first bridge section, said first bridge section including first and second bridge arms selectively connectable in parallel or two separate output lines and connected to a direct current source, said first and second bridge arms each containing controllable semiconductor switch units;
    a second bridge section, said second bridge section being connected to said direct current source and including a third bridge arm containing controllable semiconductor switch units,
    wherein said controllable semiconductor switch units of at least said first bridge section are controllable via pulse-width modulation to regulate current magnitude; and
    a control unit for selecting between alternating-current drive and direct current drive modes.

2. The electric motor drive of claim 1, wherein, when operating as a direct-current drive, said first and second bridge sections collectively function as a DC/DC bridge.

3. The electric motor drive of claim 1, wherein said first and second bridge arms of said first bridge section are connected in parallel for direct current drive operation and are connected to separate output lines for alternating current operation.

* * * * *